United States Patent [19]
Colvin et al.

[11] 3,922,635
[45] Nov. 25, 1975

[54] METHOD OF LOCATING AND DESTROYING WATER BORNE TARGETS

[75] Inventors: Gabriel M. Colvin, Laurel; Robert J. Urick, Silver Spring, both of Md.

[73] Assignee: The United States of America as represented by the Secretary of the Navy, Washington, D.C.

[22] Filed: Aug. 5, 1969

[21] Appl. No.: 849,278

[52] U.S. Cl. .................................. 340/6 R; 102/18
[51] Int. Cl.² ............................................ G01S 3/80
[58] Field of Search ... 102/18, 19.2, 70.2 R, 70.2 P; 340/6, 16, 5

[56] References Cited
UNITED STATES PATENTS

| | | |
|---|---|---|
| 2,396,699 | 3/1946 | Hayes et al. ...................... 102/18 X |
| 3,016,829 | 1/1962 | Hall .................................. 102/18 |

*Primary Examiner*—Richard A. Farley
*Attorney, Agent, or Firm*—R. S. Sciascia; J. A. Cooke

[57] ABSTRACT

A method of locating and destroying water borne targets by planting vibration transducers in the sea bed to detect the presence of distant targets. Planting perpendicularly arranged transducer pairs permits calculation of target bearings and planting of a plurality of perpendicular transducer pairs permits determination of target position. Position information is used to remotely detonate buried under water ordnance devices. Alternatively, an underwater ordnance device may be equipped with a single vertically oriented vibration transducer to sense the passing of a target above it and eliminate the need for remote detonation.

6 Claims, 4 Drawing Figures

PRIOR ART

INVENTORS
Gabriel M. Colvin
Robert J. Urick 3,922,635

METHOD OF LOCATING AND DESTROYING WATER BORNE TARGETS

BACKGROUND OF THE INVENTION

This invention relates generally to a method of underwater detection of targets, and more particularly, to a method of positioning and destroying targets by under water sensing of vibrations.

The detection of both surface shipping and submarines in shallow water has presented at least two problems of particular significance, especially in the field of coastal defense. The first of these is that of detecting the presence of vessels at the maximum possible range for surveillance purposes. The second is that of sensing the passage of shipping over a precise point on the sea bed to detonate an ordnance device, such as a naval mine.

The shallow water environment is important in considering an approach to both of these problems, because most coast lines are contiguous with relatively wide belts of shallow water. Consequently, these shallow waters are most strategically located for both coastal surveillance and mine laying purposes.

In the past, proposed solutions to these problems have centered about techniques of detecting acoustic signals present in the sea water itself. For example, the deployment of hydrophone arrays in coastal waters to listen for ship sounds has been proposed. The difficulty with this type of approach is the reliance placed on the transmission of acoustic waves from a sonic source, such as a vessel, to a remote transducer directly and entirely through the medium of sea water. The accuracy of such methods of detection are dependent upon the uncertainties of the acoustic transmission characteristics of water, especially shallow water.

One of the well known properties of shallow water is that it possesses a high attenuation rate for sonic signals of wave lengths which are long relative to the water depth. This property is especially troublesome since sonic or acoustic waves generated by large ocean going vessels are often of very long wave lengths and do not transmit well through shallow water. As a result, previously proposed methods of long range ship detection have not been entirely satisfactory.

Additionally, transducers which are activated by sonic or acoustic signals transmitted directly through water have played an important role in previously proposed methods of detonating underwater ordnance devices. Again, reliance on the sound transmitting characteristics of water has caused such detonating methods to be ineffective under some circumstances. More specifically, detonators for underwater mines must be capable of distinguishing the exact time at which a target vessel reaches its point of closest approach to the mine. Detonators relying on acoustic transmissions through water are not capable of so doing with a great degree of accuracy because of the profusion of surface and bottom echoes, always present in shallow water, which tend to obscure the precise location of the vessel. In addition, such detonators have been found unsuitable in regions where mines settle into soft bottom mud which prevents water transmitted acoustic signals from reaching their detonators at all.

Thus, it is apparent that previously considered methods of shallow water target detection and destruction are unsatisfactory due to their reliance on acoustic transmissions exclusively through the water medium.

SUMMARY OF THE INVENTION

Accordingly, one object of this invention is to provide an accurate method of long range underwater location of water borne targets.

Another object of the invention is the provision of a method of determining the bearing of a distant water borne target.

A further object of this invention is to provide a method of underwater detection of a water surface or subsurface target by sensing underwater vibrations.

Yet another object of this invention is to provide an improved method of underwater location and destruction of water borne targets.

A still further object of this invention is the provision of an improved method of detonating a buried ordnance device in response to the passing of a target.

Briefly, in accordance with one embodiment of this invention, these and other objects are achieved by planting pairs of perpendicularly arranged unidirectionally responsive vibration transducers in a solid environment such as the sea bed, to sense the vibrational disturbances produced by water borne targets. By vectorially adding the transducer outputs, the position of a target is determined and underwater ordnance devices proximate to the target may be remotely detonated. In an alternative embodiment underwater ordnance devices, themselves, are equipped with vibration responsive transducers.

BRIEF DESCRIPTION OF THE DRAWINGS

A more complete appreciation of the invention and many of the attendant advantages thereof will be readily appreciated as the same becomes better understood by reference to the following description when considered in connection with the accompanying drawings wherein.

DESCRIPTION OF THE PREFERRED EMBODIMENT

Figure 1:
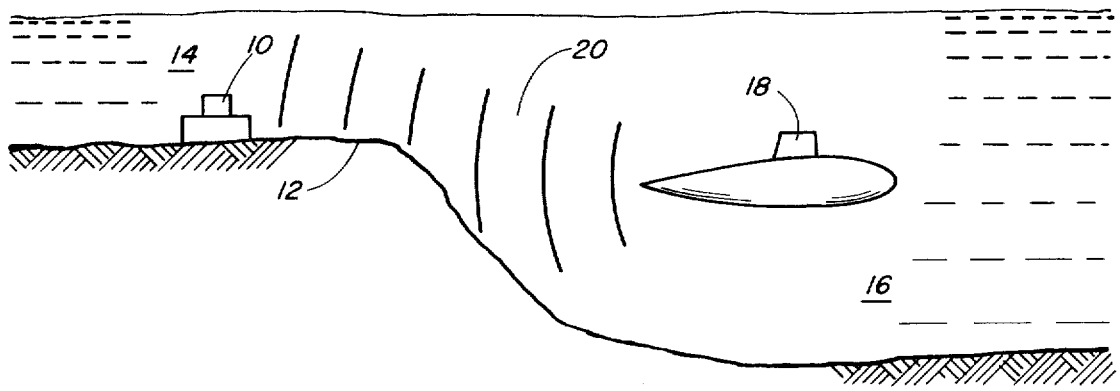
FIG. 1 is a schematic illustration of a prior art method of water borne target detection.

Referring now to the drawings wherein like reference characters designate identical or corresponding elements throughout the several views, and more particularly to FIG. 1 thereof, the operating principle of a prior art detection system is shown as including a sonic transducer or hydrophone 10 resting on a sea bed 12. Hydrophone 10 is submerged in an area of relatively shallow water 14, which may, for example, represent coastal waters. A vessel 18, which may by a submarine or a surface ship, is shown traveling through deeper water 16 emitting an acoustic signal 20, which is generally of a relatively long wave length. The acoustic signal is readily transmitted in deeper water 16, but is likely to be substantially attenuated as it passes into the shallow water 14 surrounding hydrophone 10. The portion of acoustic signal 20 directly reaching hydrophone 10 is transformed into a processable electrical signal by conventional transducing elements. The shortcomings of this prior art method have been disclosed hereinbefore.

Figure 2:
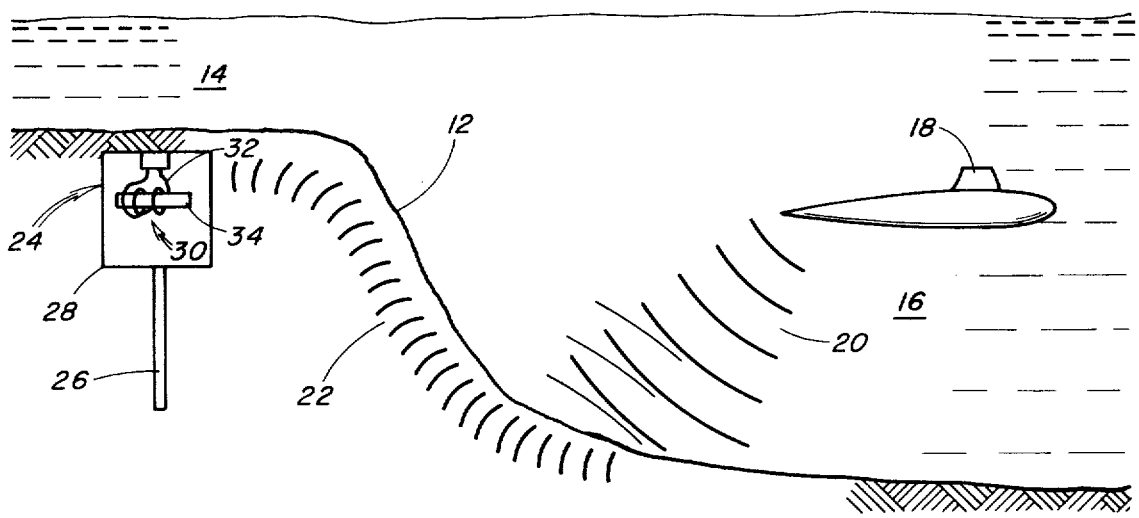
FIG. 2 is a schematic illustration of one embodiment if the instant method of water borne target location.

The contrasting operation of the instant method of target location is illustrated in FIG. 2, wherein a part of the acoustic signal 20 generated by a target vessel is shown impinging on sea bed 12. In so doing, the impinging part of the acoustic energy is transmitted vertically into the sea bed, while other portions are either dissipated or reflected. The major portion thereof, however, is transformed into a complex surface wave 22 radiating in all directions through the medium of the sea bed 12. Wave 22 preserves the fundamental wave length and frequency characteristics of acoustic signal 20, but does not rely on the fluid medium of the sea water for its transmission to distant points. Instead it travels exclusively through the solid medium of the sea bed 12, which transmits long wave lengths without the severe attenuation of shallow water. It will be apparent then, that utilization of the sea bed as a transmission medium obviates the problem of shallow water attenuation of long wave lengths.

To sense the presence of bed wave 22, and thereby detect the approach of target vessel 18, a bed vibration transducer, or geophone 24 is buried in the sea bed 12. If the bed 12 is of a soft material, such as mud or silt, a rod 26 may be secured to the base of geophone 24 to improve the contact between geophone 24 and bed material. Since harder bed materials are better vibration transmitters, rod 26 preferably should be of a sufficient length to be driven into contact with bed rock which may lie several feet below the surface of sea bed 12.

The geophone 24 may be an entirely conventional instrument of the type which is normally used to measure earth tremors and the like. An example of a commercially available unit suitable for use in the method of the instant invention is the Mandrel Industries Model EVS-L geophone.

In essence, a typical geophone comprises a housing 28 which is rigidly mounted on or in the earth for movement therewith. Within the housing 28 is mounted a transducer assembly 30 which may include an electric coil 32 rigidly mounted on housing 28, for motion therewith. Movably mounted within the coil is a magnetic body 34 of relatively high inertia. The magnetic body 34 is suspended within housing 28 in a manner to minimize the mechanical coupling between the magnetic body and the housing. This allows the movement of housing 28 and coil 32 affixed thereto by earth tremors, without movement of magnetic body 34. The relative motion thus produced between coil 32 and magnetic body 34 generates a detectable electrical signal of a magnitude proportional to the magnitude of the earth tremor.

Figure 3:
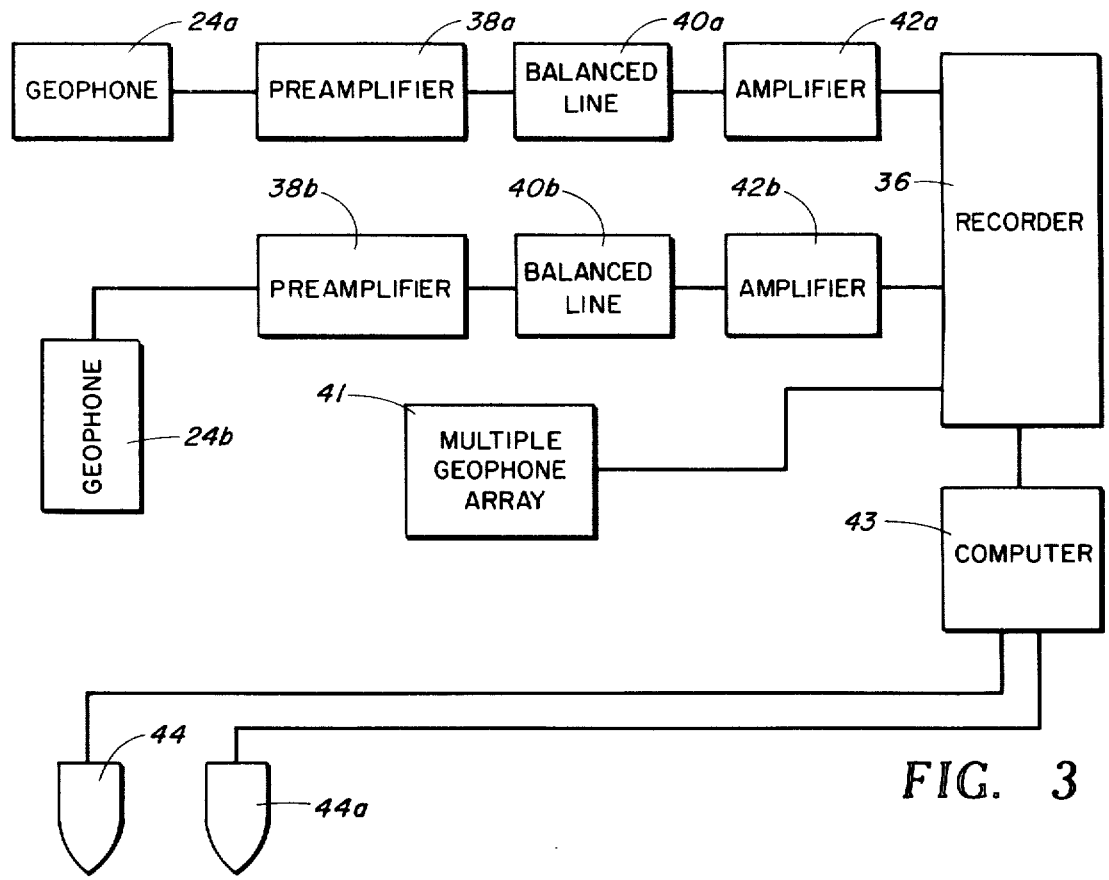
FIG. 3 is a block diagram of the apparatus employed in a method of target location and destruction according to the present invention; and, FIG. 4 is a schematic illustration of an alternative embodiment of a method of target detection and destruction of the present invention.

Operationally, geophones are highly directionally responsive as a result of their structural configuration. This operational feature is used advantageously to accurately determine the locations of water borne targets. More particularly, as shown in FIG. 3, geophones 24a and 24b may be deployed in perpendicularly arranged pairs. The geophone pairs may be coupled to a recorder 36 and the detected signals recorded thereon through a suitable electrical system including preamplifiers 38a, 38b, balanced lines 40a, 40b, and amplifiers 42a and 42b. The preamplifier and amplifier circuits may be of the conventional high gain variety, with good low frequency response characteristics. The balanced lines 40a, 40b may be transformer coupled to the preamplifier and amplifier circuits for the purpose of reducing the influence of ambient noise by common mode rejection. The outputs of perpendicular geophones 24a, 24b may be visually read at recorder 36 and manually added vectorially to determine the bearing of a detected water borne target.

A plurality of perpendicularly arranged geophones 24a, 24b with transmission lines 38a, 38b, 40a, 40b, 42a, 42b shown as a multiple geophone array 41 may be deployed in coastal waters to obtain target bearings in the same manner from several different locations. These bearings may then be manually plotted to determine the exact position of a detected target. As an alternative to manual calculations and plotting; all geophone outputs may be applied to a computer 43, which automatically calculates the target position. Computer 43 may be coupled to a plurality of remotely located under water ordnance devices 44, 44a, planted in the sea bed 12 to detonate one or more of ordnance devices within a lethal distance from the detected target.

Figure 4:
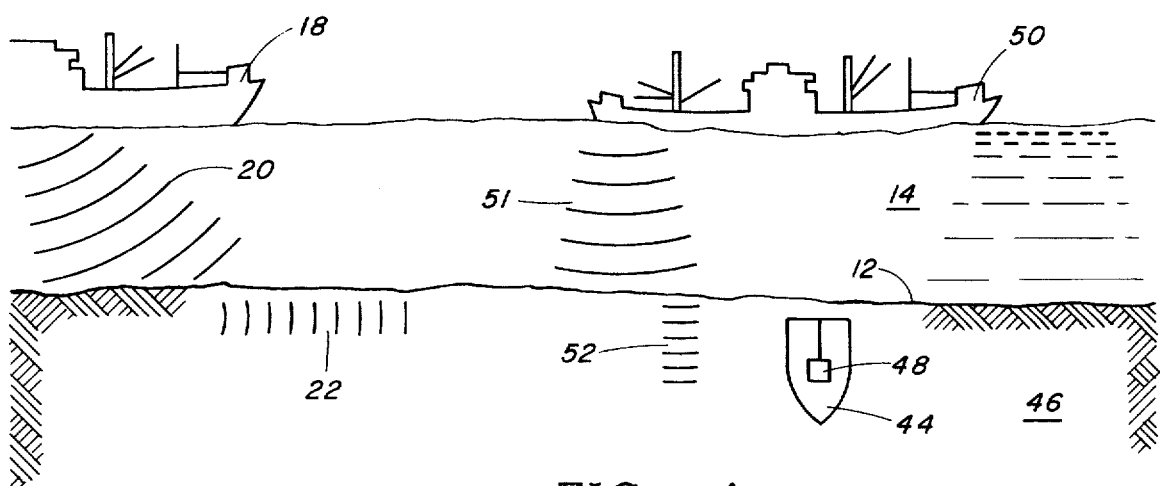

In some instances it may be desirable to actuate an underwater ordnance device such as a mine in response to the passing of a water borne target without reliance on a remotely located detection system. In such instances a unidirectional vibration transducer, or geophone 48 is included in the firing system of the mine 44. Such an arrangement is depicted in FIG. 4 wherein the mine 44 is shown buried in a body of soft material 46 at the bottom of shallow water 14. The mine 44 may have settled into the bottom material 46 because of its weight, or it may have been intentionally buried as an effective method of concealment.

Geophone 48 differs from geophone 24 only in its vertical orientation. Its operation, therefore, is the same as that of geophone 24 except that it is responsive only to vertical bed vibrations. In operation, passage of a nearby vessel 50 over the position of mine 44 generates a downwardly directed acoustic signal 51 which creates a vertical bed wave 52. Vibrations produced by bed wave 52 in bottom material 46 will cause ordnance device 44 to vibrate along a vertical axis, with the result that vertically oriented geophone 48 produces a firing signal. In practice it has been found that a vertically oriented geophone such as 48 does not respond to surface vibrations 22 produced by a distant vessel 18, but its response increases rapidly when a target vessel 50 begins to pass directly over it.

It will be observed that although the instant method of vessel detection and ordnance detonation is especially advantageous in shallow water applications, it is not limited thereto, but may be practiced successfully in waters of any reasonable depth.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method of detecting water borne vessels comprising the steps of:

positioning at least one unidirectional vibration responsive transducer in the bed material beneath a body of water; and sensing the vibrations of said bed material produced by vessels in said body of water by means of said transducer.

2. A method of detecting water borne vessels as in claim 1 wherein said step of positioning is carried out in shallow water.

3. A method of determining the bearings of a distant water borne vessel comprising the steps of:
   burying a first unidirectionally responsive vibration transducer in the bed material beneath a body of water;
   burying a second unidirectionally responsive vibration transducer in said bed material oriented perpendicularly to the orientation of said first vibration transducer;
   sensing vibrations in said bed material caused by distant vessels by means of said first and second transducers; and
   vectorially adding the responses generated by said first and second transducers.

4. a method of detonating an underwater ordnance device in response to the passing of vessels comprising the steps of:
   equipping a mine with a unidirectionally responsive vibration transducer;
   orienting said transducer to be responsive to vibrations only in a vertical direction;
   burying said mine with said transducer so oriented in the bed material beneath a body of water traveled by vessels to allow said transducer to respond to vertical vibrations generated in the bed material by the passage of a vessel over said mine.

5. A method of determining the position of a water borne target comprising the steps of:
   burying a plurality of pairs of perpendicularly arranged unidirectionally responsive vibration transducers in the bed material beneath a body of water;
   sensing vibrations in said bed material caused by a distant water borne target by means of said plurality of buried transducer pairs; and
   computing the position of said water borne target from the combined responses of said plurality of buried transducer pairs.

6. A method of locating and destroying a water borne target comprising the steps of:
   burying a plurality of pairs of perpendicularly arranged unidirectionally responsive vibration transducers in diverse locations in the bed material beneath a body of water;
   burying a plurality of underwater ordnance devices in diverse locations in said bed material;
   sensing vibrations in said bed material caused by said distant target by means of said buried transducer pairs;
   computing the position of said water borne target from the combined responses of said plurality of buried transducer pairs; and
   firing selected ones of said buried underwater ordnance devices in response to the computation of said target position.

* * * * *